B. C. BALL & L. E. YOUNIE
DEMOUNTABLE TIRE RIM.
APPLICATION FILED FEB. 5, 1912.

1,157,141.

Patented Oct. 19, 1915.

Witnesses
B. M. Hartman
V. C. Hess

Inventors
Bert C. Ball
and Lewis E. Younie
by W. Lord
Attorney

UNITED STATES PATENT OFFICE.

BERT C. BALL AND LEWIS EDWARD YOUNIE, OF PORTLAND, OREGON.

DEMOUNTABLE TIRE-RIM.

1,157,141.  Specification of Letters Patent.  Patented Oct. 19, 1915.

Application filed February 5, 1912. Serial No. 675,561.

*To all whom it may concern:*

Be it known that we, BERT C. BALL and LEWIS E. YOUNIE, citizens of the United States, residing at Portland, in the county of Multnomah and State of Oregon, have invented new and useful Improvements in Demountable Tire-Rims, of which the following is a specification.

This invention relates to demountable tire rims and consists in certain improvements in the construction thereof as will be hereinafter fully described and pointed out in the claims.

As shown, the rim is designed for tires formed with inextensible edges and commonly called the Dunlop type of tire, but some features of the invention are capable of use in connection with rims adapted to other forms of tires.

The invention is illustrated in the accompanying drawings as follows:—

Figure 1:
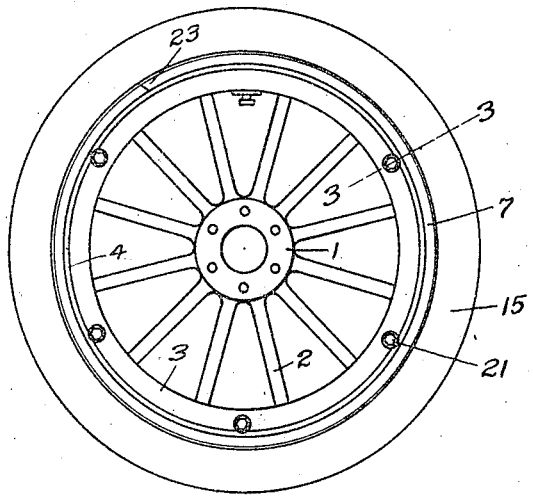
Figure 2:
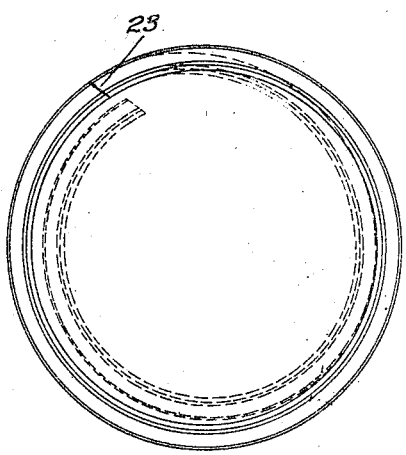
Figure 3:
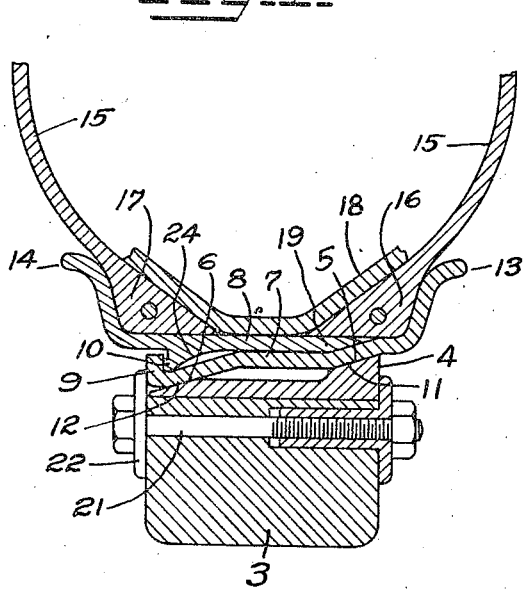
Figure 4:
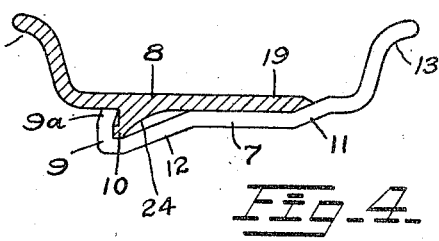
Figure 5:
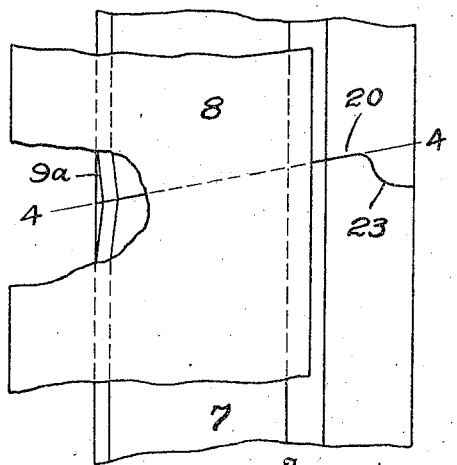

Figure 1 shows a side elevation of a wheel with a tire in place thereon. Fig. 2 a side elevation of a rim showing the method of disengaging the parts, the radial dimension of the rim being exaggerated to better show construction. Fig. 3 is a cross section on the line 3—3 in Fig. 1. Fig. 4 is a section on the line 4—4 in Fig. 5. Fig. 5 a plan view of a fragment of a rim.

1 marks the wheel hub, 2 the spokes and 3 the felly. These are of ordinary construction. A fixed rim 4 is fixed on the felly 3. It has the tapered or slanting surfaces 5 and 6. The demountable rim is formed in two parts, the part 7 being separated transversely at 20 and the part 8 is a complete ring arranged outside of the separated part 7. The separated rim part has the outwardly extending shoulder 9 which interlocks with and engages the inwardly extending shoulder 10 on the rim part 8.

The rim part 7 has the supporting surfaces 11 and 12 which are adapted to engage the tapered surfaces 5 and 6 on the fixed rim 4. The rim parts 7 and 8 also have the tire retaining flanges 13 and 14 formed directly on the rim parts. A tire 15 is shown in place on the rim. It has the reinforced edges 16 and 17. A portion of the inner tube is shown as 18.

The rim part 8 has a lip 19 extending laterally from the shoulder 10 and overlapping the rim part 7. This lip performs very important functions. It should extend far enough across the rim part 7 to form a closure with the edge 16 of the tire, thus preventing any leakage to the inner surface of the tire through the separated part 20. Bolts 21 extend through the felly and these are provided with the heads or washers 22 of sufficient size to engage the edge of the rim part 7. As the bolt is tightened, the surfaces 11 and 12 acting on the surfaces 5 and 6 force the rim part 7 against the inner surface of the rim part 8, thereby clamping the rim part 7 against the rim part 8. This is particularly important in the separated rim part where the tire retaining flange is formed directly on the rim part because with this construction, the ends of the separated rim part 7 are dependent upon their resistance to lateral bending to support the side thrust of the tire. By securely clamping the ends of the separated rim part against the rim part 8 which is in the form of a complete ring, these ends are spliced as it were, so that any give at the point of separation must be consequent upon actual bending in the short distance in which the tire retaining flange projects beyond the clamped portions. In this clamping feature, therefore, the lip 19 assists materially by extending the clamped portion to points near the separated flange of the rim part 7.

When it is desired to detach a tire, this can be accomplished by springing in one end of the separated rim part 7 so that the shoulder 9 will clear the shoulder 10. As soon as the end sprung in clears the opposite end of the rim part, the end sprung in may be pulled past the one in place thus stripping the separated rim part from the rim part 8. This same action tears the rim part loose from the edge of the tire if it has become cemented to it.

In order to prevent the disengagement of the rim parts with the tire inflated and the rim parts demounted, it is desirable to give the abutting surfaces of the ends of the rim part 7 as little clearance as possible especially along the separation 23 which extends through the tire retaining flange. The lateral pressure of the tire acting on the flange 13 has a cam action on the flange which tends to collapse this rim part, thus forcing the ends of the rim part into close engagement. So long as the pressure is maintained on the tire neither end of the separated rim part can be sprung inwardly because of this engagement and in this way, the disengagement of the rim parts is avoided. As an additional feature of safety, however, we prefer to undercut the shoulder 10, as clearly shown, and to bend inwardly the ends of the shoulder 9 at 9ᵃ and in this manner to lock this edge of the rim part against disengagement while the tire is inflated.

In order to facilitate the removal of the rim parts, we prefer to provide the shoulder 24 on a slant or sloping inwardly. Where this is done, one end of the separated rim part can be put in place, and the rim part then forced to position by simply crowding it laterally, the sloping surface 24 acting as a cam to force the edge of the shoulder 9 inwardly so as to clear the shoulder 10.

It will be noted that the part 8 is formed of special rolled material having the shoulder 10 rolled thereon, while the part 7 can be formed of flat stock being of uniform thickness throughout. In this connection the slanting portion directly above the surface 12 is of importance in that the lateral strain on this portion is less apt to effect the bending of the material where this is carried on a slant than as though the shoulder was formed at planes at right angles to the axis.

What we claim as new is:—

1. In a demountable tire rim, the combination of two rim parts, the first part separated transversely and having a tire retaining flange at one edge, and an exterior locking shoulder at the side of the assembled rim the more remote from the tire retaining flange on said first part; and a second part forming a complete ring and having an interior locking shoulder engaging the exterior locking shoulder on the first part, having a tire retaining flange at its edge, and having a lip extending inwardly from the locking shoulder overlapping the first part to a point adjacent to the tire retaining flange on the first rim part and adapted to form a closure with a tire edge engaging the tire retaining flange on the first rim part.

2. In a demountable tire rim, the combination of two rim parts, the first part forming a complete ring and having an interior locking shoulder; and a second part separated transversely and having an exterior shoulder thereon for engaging said interior shoulder, said rim parts having tire retaining flanges thereon sloping outwardly from the bottom of the assembled rim and tending to collapse said parts under the lateral pressure of the tire, the separated rim part having its ends abutting and adapted to be brought into engagement by the collapsing movement incident to the inflation of the tire to prevent the separation of the ends when the tire is demounted and inflated.

3. In a demountable tire rim, the combination of two rim parts, the first part separated transversely and having a tire retaining flange at one edge, and an exterior locking shoulder at the side of the assembled rim the more remote from the tire retaining flange on said first part; and a second part forming a complete ring and having an interior locking shoulder engaging the exterior locking shoulder on the first part, having a tire retaining flange at its edge, and having a lip extending inwardly from the locking shoulder overlapping the first part to a point adjacent to the tire retaining flange on the first rim part and adapted to form a closure with a tire edge engaging the tire retaining flange on the first rim part, said tire retaining flanges sloping outwardly from the bottom and tending to collapse the parts under the lateral pressure of an inflated tire on said retaining flanges, the separated rim part having its ends abutting and adapted to be brought into engagement by the collapsing movement incident to the lateral pressure of an inflated tire on the flanges to prevent the separation of the ends when the tire is demounted and inflated.

4. In a demountable tire rim, the combination of an annulus having an interior shoulder; a rim part secured thereto, said rim part being separated transversely and having an exterior shoulder engaging said interior shoulder, said shoulders being undercut adjacent to the ends of said rim part, and having a tire retaining flange thereon, said tire flange sloping outwardly and tending to collapse said rim part under the lateral pressure of an inflated tire and the ends of said rim part abutting and adapted to be brought into engagement by the collapsing movement incident to the lateral pressure of an inflated tire to prevent the separation of the ends when the tire is demounted and inflated.

5. In a demountable tire rim, the combination of two rim parts, the first part forming a complete ring having an interior shoulder thereon, and a tire retaining flange thereon; and a second rim part separated transversely and having an exterior shoulder thereon for engaging said interior shoulder, said shoulders being undercut adjacent to the ends of the separated rim part, the said second rim part having a tire retaining flange thereon, said tire retaining flanges sloping outwardly and tending to collapse said separated rim part by the lateral pressure of an inflated tire thereon, and the separated rim part having its ends abutting and adapted to be brought into engagement by the collapsing movement incident to a lateral pressure of an inflated tire to prevent the separation of the ends when the tire is demounted and inflated.

6. In a demountable tire rim, the combination of two rim parts, one in the form of a complete ring, having an interior locking shoulder thereon, and a tire retaining flange; and a second rim part having an exterior shoulder thereon, and a tire retaining flange, the said second rim part being separated transversely and formed of material of uniform thickness, the portion of the rim part opposite the engaging surface of the exterior shoulder being on a slant to said engaging surface for the purpose described.

In testimony whereof we have hereunto set our hands in the presence of two subscribing witnesses.

BERT C. BALL.
LEWIS EDWARD YOUNIE.

Witnesses:
H. V. CARPENTER,
ELIJAH CORBETT.